(12) United States Patent
Papin et al.

(10) Patent No.: US 12,377,620 B2
(45) Date of Patent: Aug. 5, 2025

(54) METHOD FOR PRODUCING A COMPOSITE CYLINDRICAL TANK AND COMPOSITE TANK PRODUCED BY THIS METHOD

(71) Applicants: L'AIR LIQUIDE SOCIÉTÉ ANONYME POUR L'ÉTUDE ET L'EXPLOITATION DES PROCÉDÉS GEORGES CLAUDE, Paris (FR); COVESS NV, Hasselt (BE)

(72) Inventors: Philippe Papin, Jouy-en-Josas (FR); Tony Vanswijgenhoven, Hasselt (BE)

(73) Assignees: L'AIR LIQUIDE SOCIÉTÉ ANONYME POUR L'ÉTUDE ET L'EXPLOITATION DES PROCÉDÉS GEORGES CLAUDE, Paris (FR); COVESS NV, Hasselt (BE)

( * ) Notice: Subject to any disclaimer, the term of this patent is extended or adjusted under 35 U.S.C. 154(b) by 219 days.

(21) Appl. No.: 18/334,032

(22) Filed: Jun. 13, 2023

(65) Prior Publication Data

US 2023/0415435 A1 Dec. 28, 2023

(30) Foreign Application Priority Data

Jun. 23, 2022 (EP) ..................................... 22305909

(51) Int. Cl.
*B29C 70/72* (2006.01)
*B29C 70/32* (2006.01)
(Continued)

(52) U.S. Cl.
CPC .............. *B29C 70/72* (2013.01); *B29C 70/32* (2013.01); *B29K 2101/12* (2013.01);
(Continued)

(58) Field of Classification Search
CPC ...................................................... B29C 70/72
See application file for complete search history.

(56) References Cited

U.S. PATENT DOCUMENTS 2,744,043 A 5/1956 Ramberg
3,047,191 A * 7/1962 Young .................... B64D 37/06
156/169

(Continued)

FOREIGN PATENT DOCUMENTS

EP 2571671 B1 * 7/2015
WO WO 2011/143723 A2 11/2011
WO WO-2011/144234 A1 * 11/2011

OTHER PUBLICATIONS

Extended European Search Report as issued in European Patent Application No. EP22305909.8, dated Dec. 7, 2022.

*Primary Examiner* — Jeffry H Aftergut
(74) *Attorney, Agent, or Firm* — Pillsbury Winthrop Shaw Pittman LLP (57) ABSTRACT

A method for producing a fibre composite cylindrical tank for containing a fluid, includes assembling a reusable and removable tool kit; applying an end fitting to the tool kit, the end fitting having an opening large enough for removing the tool kit there through after being disassembled; forming a barrier layer by swaddling the assembled tool kit with a breather piece; forming a first shell layer by winding a first composite tape, made of a first composite material mixing fibre and resin, over the barrier layer, and disassembling and removing the tool kit through the opening.

10 Claims, 5 Drawing Sheets

(51) Int. Cl.
 *B29K 101/12* (2006.01)
 *B29K 307/04* (2006.01)
 *B29K 309/08* (2006.01)
 *B29L 31/00* (2006.01)

(52) U.S. Cl.
 CPC ...... *B29K 2307/04* (2013.01); *B29K 2309/08* (2013.01); *B29L 2031/7156* (2013.01)

(56) References Cited

U.S. PATENT DOCUMENTS

| | | | | |
|---|---|---|---|---|
| 3,260,398 | A | * | 7/1966 | Levenetz .................. F17C 1/16 220/62.19 |
| 3,367,815 | A | * | 2/1968 | Ragettli ................ B29C 53/824 156/417 |
| 8,932,695 | B1 | | 1/2015 | Villarreal et al. |
| 2021/0129662 | A1 | | 5/2021 | Beckner et al. |

\* cited by examiner

METHOD FOR PRODUCING A COMPOSITE CYLINDRICAL TANK AND COMPOSITE TANK PRODUCED BY THIS METHOD

CROSS-REFERENCE TO RELATED APPLICATIONS

This application claims priority to European Patent Application No. 22305909.8, filed Jun. 23, 2022, the entire content of which is incorporated herein by reference in its entirety.

FIELD

The invention relates to pressurized fluid storage tanks.

More specifically, the invention relates to a method for producing a fibre composite cylindrical tank for containing a pressurised fluid and a fibre composite cylindrical tank obtained by this method.

BACKGROUND

The use of high-pressure fibre composite tanks is increasing notably for hydrogen transportation. A thermoplastic type V tank constitutes an interesting composite tank design to comply with hydrogen usage.

Usually, so-called thermoplastic type V tanks present a homogeneous liner made from the same resin as the tank. The term "liner" is used here to describe the part on the inner surface of the tank that guarantees the tightness of the tank. Alternatively, type V tanks may have no liner.

Linerless type V tanks can be produced by winding, around a removable tool kit, a fibre composite film playing the role of a barrier layer and with the same resin used for the tank, making the tank more homogeneous, as described in the international patent application WO2011/143723 by one of the co-applicants of this application.

Winding a film around the whole surface of the removable tool kit, which matches the tank surface, might be time consuming and requires the use of a winding machine. Besides, while winding, the film might tear, which increases the need to reiterate the winding process. Also, it is often difficult to find a film made of a material that is chemically compatible with the resin used for the tank.

The present application presents an improvement of the method described in the international patent application WO2011/143723 in order to produce a linerless type V composite tank.

SUMMARY

There is a need for a storage tank for pressurized fluids with homogeneous walls guaranteeing the tank tightness, as well as a need for convenient method for producing such storage tank.

To this end, an aspect of the invention relates to a method for producing a fibre composite cylindrical tank for containing a fluid, comprising the following steps:
 a step of assembling a reusable and removable tool kit;
 a step of applying an end fitting to the tool kit, said end fitting having an opening large enough for removing the tool kit there through after being disassembled;
 a step of forming a barrier layer by swaddling the assembled tool kit with a breather piece;
 a step of forming a first shell layer by winding a first composite tape, made of a first composite material mixing fibre and resin, over the barrier layer;
 a step of disassembling and removing the tool kit through the opening.

Swaddling is wrapping without winding. The breather piece is a non-woven material made of fibres.

An aspect of the invention removes a film winding step in a method of producing a fibre composite tank, thereby shortening the producing time. Also, the use of a breather material widens the choice of materials chemically compatible with the first composite tape and thus facilitates the production method.

In an embodiment, the method further comprises a step of forming a second shell layer by winding a second composite tape made of a second composite material mixing fibre and resin over the first shell layer and over an outer peripheral portion of the end fitting, said outer peripheral portion surrounding the opening. The second shell layer allows for the fibre composite tank to withstand higher pressure values, typically working pressures of 700 bar.

Beneficially, the breather piece is made of polyester or polyamide or any other polymer chemically compatible with the resins of the first composite material and of the second composite material. The breather can also be a combination of different polymers such as polyester and polyamide for instance.

Beneficially, the breather piece comprises a mass per area unit comprised between 110 g/m$^2$ and 600 g/m$^2$. The choice of the mass per area unit of the breather piece allows adjusting the desired tightness of the fibre composite tank.

Beneficially, the breather piece comprises a thickness comprised between 2 and 3 mm.

Beneficially, the breather comprises a glass transition temperature higher than 50° C. The choice of the glass transition temperature of the breather allows implementing the invention under the conditions of existing production methods.

Beneficially, the breather piece and the first composite material are chemically compatible. The breather piece and the first composite material form together a monolithic structure. This allows improving the homogeneity of the walls of the fibre composite tank, and thus of the tightness of the latter.

Beneficially, the first composite material is a thermoplastic material.

Beneficially, the first composite material comprises carbon fibres, glass fibres or Basalt fibres.

Another aspect of the invention relates to a fibre composite cylindrical tank for containing a fluid produced by a method according to the invention, comprising a shell layer composed of a mix of a breather, a resin and fibre, and comprising an end fitting, the shell layer and the end fitting forming a unitary rigid structure able to withstand an overpressure of at least 2 bar. The fibre composite cylindrical tank obtained by this method can thus be produced more rapidly than fibre composite tanks from the prior art, while being able to withstand overpressures.

BRIEF DESCRIPTION OF THE FIGURES

The invention is further elucidated in the appending figures and figure description explaining various embodiments of the invention. Note that the figures are not drawn to scale. The figures are intended to describe the principles of the invention.

DETAILED DESCRIPTION

Unless stated otherwise, a same element appearing on different figures presents a single reference.

Furthermore, the terms "first", "second", and the like in the description and in the claims, are used for distinguishing between similar elements and not necessarily for describing a sequential or chronological order.

Figure 1:
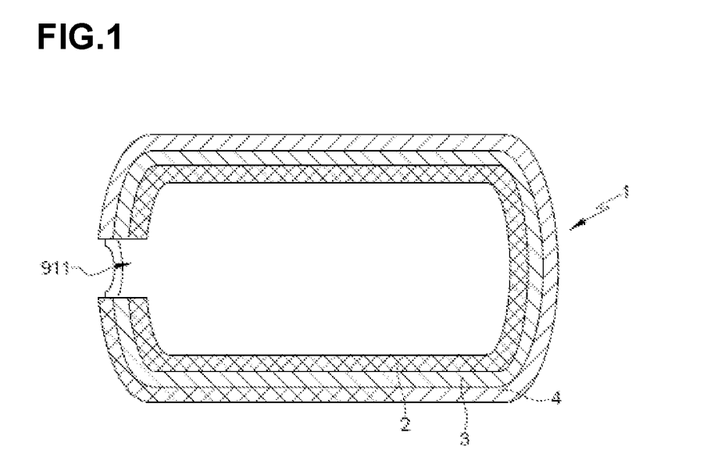
FIG. 1 represents a schematic cross-sectional view of a fibre composite tank according to the invention.

FIG. 1 shows a fibre composite tank 1 according to an embodiment of the invention. On FIG. 1, the tank 1 is cylindrical. The tank 1 has an internal volume in the range of 60 liters to 2000 liters, or even more. The fibre composite tank 1 comprises an inner barrier layer 2 and a first shell layer 3. An optional second shell layer 4 can be observed on FIG. 1. The presence of the second shell layer 4 depends on the value of the pressure that the fibre composite tank 1 has to withstand. Typically, the second shell layer 4 is needed when the fibre composite tank 1 has to withstand a pressure of the order of 50 bar or higher.

According to the embodiments, the tank 1 comprises one or two openings. In the embodiment of FIG. 1, the tank comprises only one opening 911. In the embodiments wherein the tank 1 comprises two openings (embodiments of FIGS. 10 and 11, for example), the openings are placed at two opposite ends of the tank 1, for example facing each other.

The fibre composite tank 1 can contain diverse types of fluids. By "fluids", it is meant gases or liquids. Examples of gases that can be contained in the fibre composite tank 1 are hydrogen, oxygen, or nitrogen.

In what follows, a method for producing the fibre composite tank 1 illustrated on FIG. 1 will be described. This method is an improvement of the method described in the international patent application WO2011/143723 and contains common steps that will be described below. A more detailed description of those common steps may be found in the above-mentioned international patent application.

Figure 2:
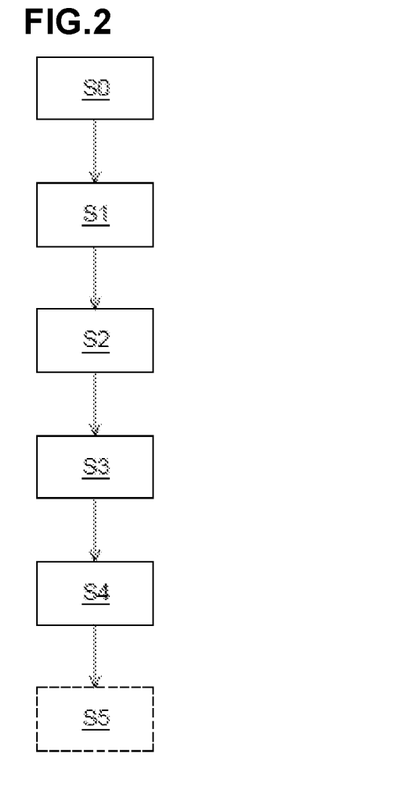
FIG. 2 illustrates the main steps of a method for producing a fibre composite tank according to an aspect of the invention.

FIG. 2 schematically illustrates the main steps of the method for producing the fibre composite tank 1 according to an aspect of the invention.

In a step S0, a reusable and removable tool kit is assembled.

Figure 3:
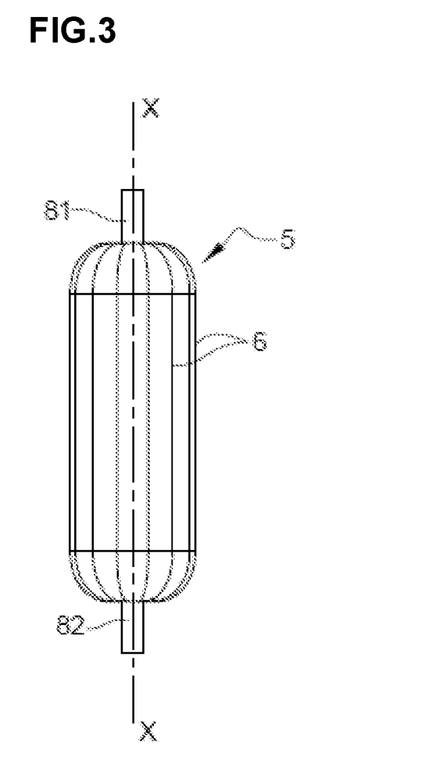
FIG. 3 represents schematically an assembled tool kit suitable for implementing a method of producing a fibre composite tank according to an aspect of the invention.

FIG. 3 shows an example of a removable tool kit 5 that can be used in the method of the present description. The removable tool kit 5 comprises a plurality of elongated segments 6 that are placed side by side to form a rounded outer surface. The tool kit 5 has a rotationally symmetric shape with a varying outer diameter around a symmetry axis XX and is suitable for film winding. This geometry provides flexibility in the choice of shapes of the fibre composite tank 1 to produce. The fibre composite tank 1 may be cylindrical, spherical, ellipsoidal, or of any other shape.

The elongated segments 6 of the tool kit 5 are made of metal, for instance of aluminium, aluminium alloy, steel or stainless steel.

Figure 4:
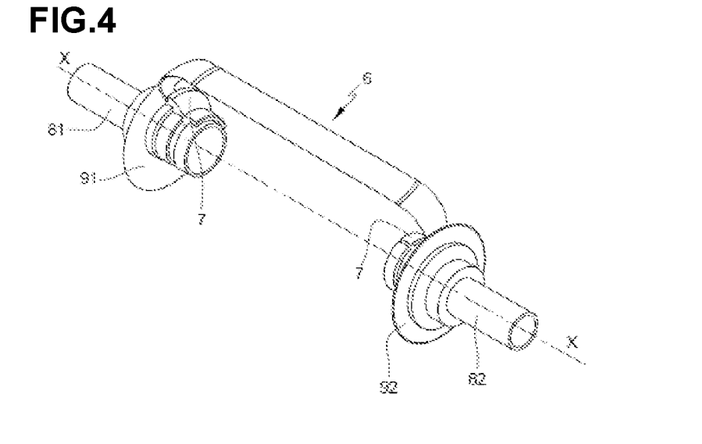
FIG. 4 represents schematically a subset of parts of the tool kit of FIG. 2.

While assembling the tool kit 5, the elongated segments 6 are hold together using segment holders 7 and two spindle parts 81 and 82. The elongated segments 6 are held in position by pulling the spindle parts 81 and 82 away from each other. The segment holders 7 are mounted onto the spindle parts 81 and 82 for engaging opposite ends of the elongated segments 6. FIG. 4 shows a subset of the elongated segments 6 hold by two segment holders 7 arranged on the two spindle parts 81 and 82 for illustration purposes.

Figure 5:
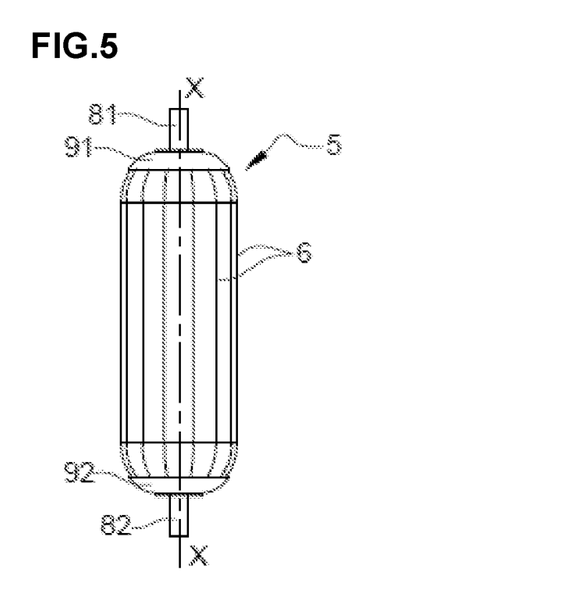
FIG. 5 represents schematically the assemble tool kit of FIG. 2 with two end fittings.

In a step S1, two end fittings are applied to the assembled tool kit 5. To apply the end fittings 91, 92 to the assembled tool kit 5, the end fittings 91 and 92 are shifted over the first and the second spindle parts 81 and 82. FIG. 5 shows the assembled tool kit with two end fittings 91 and 92 applied on it. Alternatively, only one end fitting 91 may be applied on the assembled removable tool kit. Each of the two end fittings 91 and 92 comprises an opening 911, 921 large enough to enable the disassembly and removal of the removable tool kit 5 through the opening 911, 921. The opening 911, 912 is dimensioned to enable the parts of the removable tool kit 5, once disassembled, to pass through the opening 911, 921.

The end fittings 91 and 92 will stay in place after the fabrication of the fibre composite tank 1.

In some embodiments, the end fittings 91 and 92 are made of plastic. In this case, they are well suited to produce a small, lightweight tank able to withstand moderate overpressure, for instance lower than 50 bar In some embodiments, the end fittings 91 and 92 are in a polymer compatible with the material of the inner layer 2 and of the first shell layer 3 . . . . In this case, they are well suited to produce tanks able to withstand high pressure, for instance higher than 50 bar.

The material of the end fittings 91 and 92 may be chosen in order to increase the tightness of the fibre composite tank 1

Figure 6:
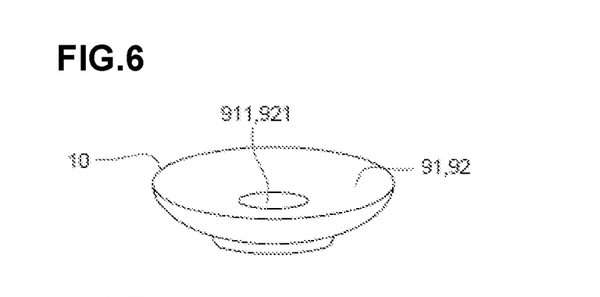
FIG. 6 represents schematically an embodiment an end fitting with an opening.

FIG. 6 shows an embodiment of the end fitting 91, 92. On FIG. 6, an outer peripheral portion 10 surrounding the opening 911, 921 can be observed. The openings 911, 921 may have a shape fitted to the shape of the parts of the tool kit 5 so as to allow their removal. In the example of FIG. 6, the openings 911, 921 are circular.

After steps S0 and S1, in a step S2, the assembled tool kit 5 together with the end fittings 91 and 92 are swaddled with a breather piece 11. By "breather", it is meant a non-woven material made of fibres. For instance, the breather can be polyester or polyamide. The breather can be made out of polymers identical to the polymers the first shell layer 3 is made of. Typically, the breather is felt. Felt is a non-woven textile material that is produced by matting, condensing and pressing fibers together.

The breather piece 11 has dimensions suitable for covering the whole surface of the assembled tool kit 5. Typically, the breather piece 11 is cut to the dimensions of the assembled tool kit 5 and laid on the assembled tool kit 5. The breather comprises a mass per area unit comprised between 110 g/m$^2$ and 600 g/m$^2$. The mass per surface of the breather is chosen so as to adapt the tightness of the tank. Typically, the breather piece 11 comprises a thickness of 2 or 3 mm. Once swaddled, the breather piece 11 forms the inner barrier layer 2.

In some embodiments, the breather comprises a glass transition temperature higher than the working temperature of subsequent steps of the method for producing the fibre composite tank 1, that will be further described. For instance, the breather comprises a glass transition temperature higher than 60° C. The glass transition temperature of the breather is notably suitable for heating per infrared radiation.

For instance, when the end fitting 91, 92 comprises an outer peripheral portion 10 around the opening 911, 921, as illustrated on FIG. 6, the breather piece 11 covers the end fitting 91, 92 outside the opening 911, 921 up to the outer peripheral portion 10.

Thus, differently from the method disclosed in in the international patent application WO2011/143723, the inner barrier layer 2 is not formed by winding a film, but by simply swaddling the assembled tool kit 5 with the breather piece 11. There is thus no need for a whole equipment suitable for film winding and no winding step. A diverse choice for the breather material is thus possible, facilitating the production of the fibre composite tank. For example, the breather material can be polyester or polyamide. The breather can be made out of polymers identical to the polymers the first shell layer 3 is made of. It is notably easier to find a breather material that is chemically compatible with resins of shell layers that will be described further than to find a film compatible with those resins.

After step S2, a step S3 is carried out where a first composite tape 12 is wound around the breather piece 11 under heat and pressure with a film winding machine The pressure conditions come from the tension applied on the first composite tape 12 during winding. The heat conditions are realized for instance by infrared radiation, or by any other heating means. In the case of heating by infrared radiation, the radiation wavelength is chosen according to the nature of the material of the first composite tape 12. The first composite tape 12 is made of a first composite material mixing fibre and resin. For instance, the first composite material can be high-strength fibre, such as glass fibre or carbon fibre, impregnated by a thermoplastic resin. In another example, the fibre of the first composite material may be metal fibre, mineral fibre, or a combination of those fibres. Examples of resin for the first composite material are polyamide 11 (PA11), polyamide 12 (PA12), polyamide 66 (PA66), polyphthalamide (PPA).

Figure 7:
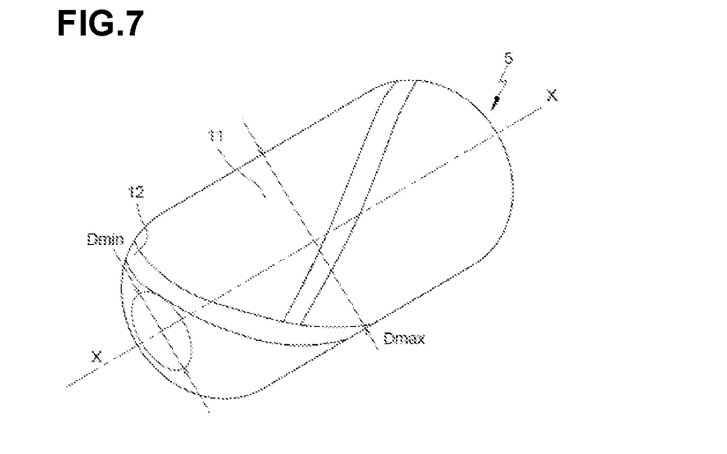
FIG. 7 represents schematically a fibre composite tank according to an aspect of the invention at an early stage of a first winding step of the method according to the invention.

FIG. 7 shows the assembled tool kit 5 swaddled with the breather piece 11 at an early stage of the winding step. For clarity, the spindle parts 81, 82 are not represented on FIG. 7. On FIG. 7, the assembled tool kit 5 has a monotonically decreasing diameter, ranging from Dmax at its equatorial down to Dmin at its opposite ends. In an embodiment, the first composite tape 12 is applied as a single continuous strip. Alternatively, the first composite tape 12 is applied as a succession of several fragments. A detailed description of the winding process and parameters can be found in the international patent application WO2011/143723, which is incorporated herein by reference in its entirety.

The breather material is chosen so as to be chemically compatible with the resin of the first composite material. By "chemically compatible", it is meant that during step S6, chemical bonds are created between the breather material and the resin of the first composite material. For instance, while winding the first composite tape 12, the breather piece 11 is filled with particles from the resin of the first composite material. The first composite material builds the tightness of the tank 1.

Figure 8:
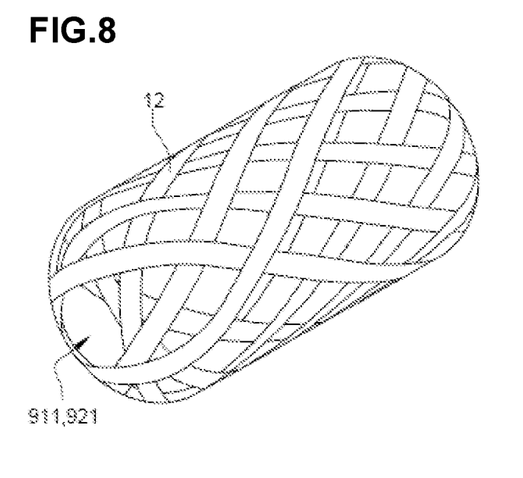
FIG. 8 represents schematically a fibre composite tank according to an aspect of the invention at a later stage of the first winding step of the method according to the invention.

FIG. 8 shows the assembled tool kit 5 swaddled with the breather piece 11 at a later stage of the winding step. Only the first composite tape 12 is visible, the swaddled tool kit 5 and the end fittings 91, 92 are hidden by the first composite tape. For clarity, the spindle parts 81, 82 are not represented on FIG. 8.

Figure 9:
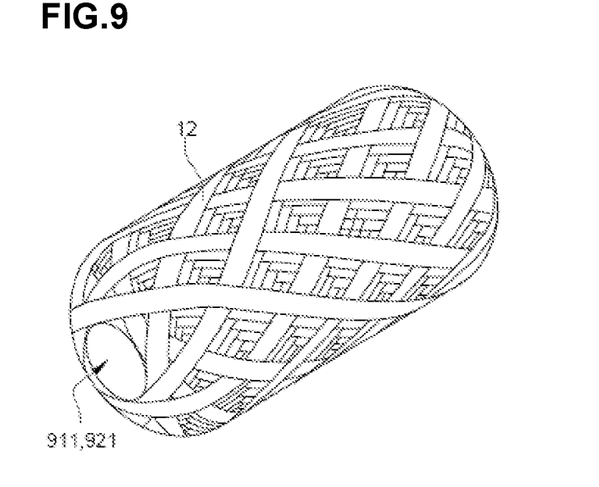
FIG. 9 represents schematically a fibre composite tank according to an aspect of the invention after the first winding step of the method according to the invention has been completed.

FIG. 9 shows the assembled tool kit 5 swaddled with the breather piece 11 after the first composite tape 12 is completely wound. Again, for clarity, the spindle parts 81, 82 are not represented on FIG. 9. The opening 911, 921 is left uncovered by the first composite tape 12 for removal of the tool kit 5. The area covered by the first composite tape 12 can be larger or smaller than the area covered by the breather piece 11, but is, in an embodiment, the same. For instance, when the end fitting 91, 92 comprises an outer peripheral portion 10 around the opening 911, 921 as illustrated on FIG. 6, the first composite tape 12 covers the end fitting outside the opening 911, 921 up to the outer peripheral portion 10. The wound first composite tape 12 forms the first shell layer 3 of the fibre composite tank 1.

Figure 10:
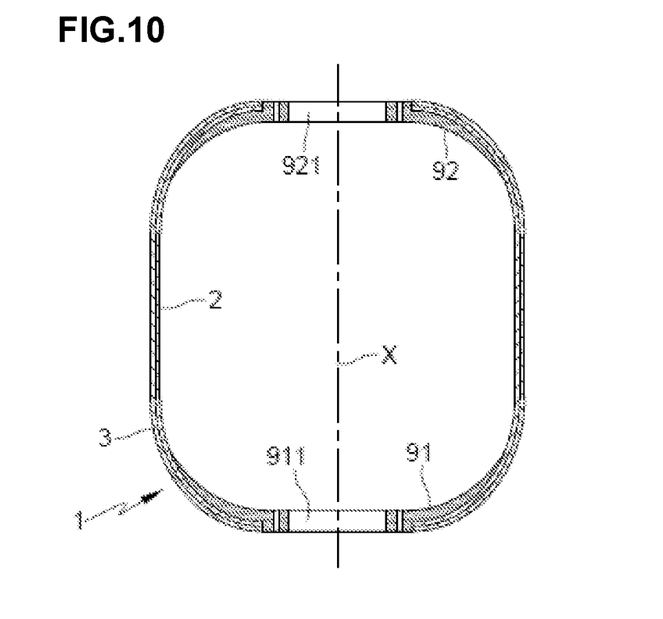
FIG. 10 represents a schematic cross-sectional view of a fibre composite tank according to an embodiment of the invention.

FIG. 10 shows an embodiment of the fibre composite tank 1, where the end fittings 91, 92 are located inside the inner barrier layer 2 formed by the breather piece 11. It can be observed that both openings 911, 921 are left uncovered.

Figure 11:
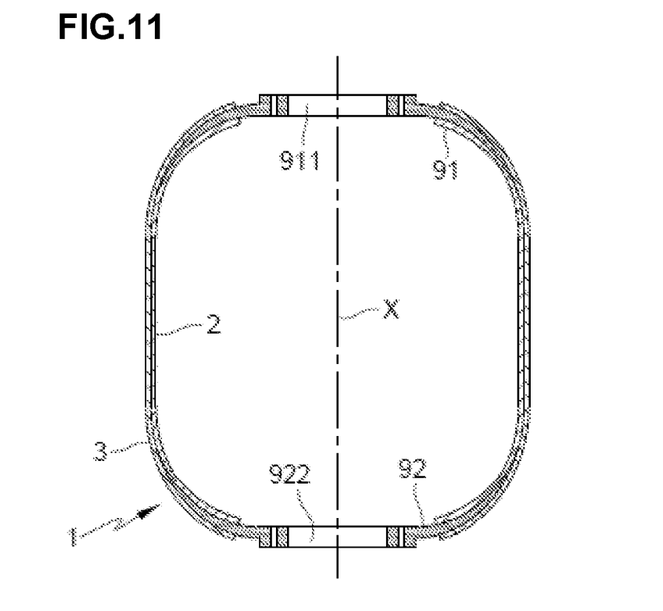
FIG. 11 represents a schematic cross-sectional view of fibre composite tank according to a second embodiment of the invention.

In another embodiment, step S2 occurs before step S1. In other words, the assembled tool kit 5 is swaddled with the breather piece 11 before both end fittings 91, 92 are applied to the assembled tool kit 5. The first composite tape 12 is wound after both end fittings 91, 92 have been applied. FIG. 11 shows a corresponding fibre composite tank 1, where the end fittings 91, 92 are located between the inner barrier layer 2 formed by the breather piece 11 and the first shell layer 3 formed by the wound first composite tape 12.

Once the first composite tape 12 has been wound, in a following step S4, the tool kit is disassembled and its different parts are removed from the fibre composite tank 1 through at least one of the openings 911, 921. The disassembly can be carried out as follows: pushing the spindle parts 81, 82 inside the tank 1, removing the segment holders 7 from the spindle parts 81,82 (e.g. by inserting a hand inside the hollow spindle parts 81, 82), extracting the spindle parts 81, 82 out of the tank 1, removing the segment holders 7 and the elongated segments 6 out of the tank 1 through the opening 911, 921, while leaving the end fittings 91 and 92 in place.

After the removable tool kit 5 has been completely disassembled and removed from the tank 1, the openings 911 and 921 are closed with end caps. The end caps are overmoulded bosses that are welded on the openings 911, 921. In an embodiment, the end caps are overmoulded metallic parts, but for working pressures less than 50 bar, they can be made of polymer or reinforced polymer only.

The inner barrier layer 2, the first shell layer 3 and the end fittings 91 and 92 form a unitary rigid structure able to withstand an overpressure of at least 2 bar. The volume of the unitary rigid structure can range from 60 liters to 2000 liters, or even more.

In some embodiments, an additional step S5 following the disassembling and removal of the tool kit 5 is carried out. After the removal of the tool kit 5, the openings are closed by welding overmoulded metal bosses on the end fittings 91, 92. Then, in step S5, a second composite tape 13 is wound around the wound first composite tape 12. The second composite tape 13 is made of a second composite material mixing fibre and resin. For instance, the second composite material can be high-strength fibre such as glass fibre, basalt fibre, carbon fibre, or any other fibre impregnated by a thermoplastic resin. In another example, the fibre of the second composite material may be metal fibre, mineral fibre, or a combination of those fibres. The resin of the second composite material is in an embodiment chemically compatible with the material of the component it is wound on, that is, the first composite material. In an embodiment, the second composite tape 13 is applied as a single continuous strip. Alternately, the second composite tape 13 is applied as a succession of several fragments. At the end of the additional step S5, the wound second composite tape 13 forms the second shell layer 4.

The inner barrier layer 2, the first shell layer 3, the end fittings 91 and 92 and the second shell layer 4 form a unitary rigid structure able to withstand an overpressure of at least 50 bar, or even more. The overpressure limit value depends on the composition, that is the assembly of materials, formed by the inner barrier layer 2, the first shell layer 3, the end fittings 91 and 92 and the second shell layer 4 The higher pressure value is achievable thanks to the second shell layer 4.

The invention can be used to produce a wide variety of fibre composite tanks for different applications, such as containers for storage for instance of hydrogen, helium, nitrogen, water, alkali, liquid acid, etc. The dimensions of the fibre composite tank 1 can range from 60 L to 2 000 L or even more.

It will be appreciated that the various embodiments described previously are combinable according to any technically permissible combinations.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The invention claimed is:

1. A method for producing a fibre composite cylindrical tank for containing a fluid, comprising:
    assembling a reusable and removable tool kit;
    applying an end fitting to the tool kit, said end fitting having an opening large
    enough for removing the tool kit there through after being disassembled;
    forming a barrier layer by swaddling the assembled tool kit with a breather piece, the swaddling being a wrapping without winding, and the breather piece being a non-woven material made of fibres;
    forming a first shell layer by winding a first composite tape, made of a first composite material mixing fibre and resin, over the barrier layer, and
    disassembling and removing the tool kit through the opening.

2. The method according to claim 1, further comprising forming a second shell layer by winding a second composite tape made of a second composite material mixing fibre and resin over the first shell layer and over an outer peripheral portion of the end fitting, said outer peripheral portion surrounding the opening.

3. The method according to claim 2, wherein the breather piece is made of polyester and/or polyamide compatible with resins of the first composite material and of the second composite material.

4. The method according to claim 1, wherein the breather piece comprises a mass per area unit comprised between 110 $g/m^2$ and 600 $g/m^2$.

5. The method according to claim 1, wherein the breather piece comprises a thickness comprised between 2 and 3 mm.

6. The method according to claim 1, wherein the breather comprises a glass transition temperature higher than 50° C.

7. The method according to claim 1, wherein the breather piece and the first composite material are chemically compatible.

8. The method according to claim 1, wherein the first composite material comprises a thermoplastic material.

9. The method according to claim 1, wherein the first composite material comprises carbon fibres, glass fibres, or Basalt fibres.

10. A fibre composite cylindrical tank for containing a fluid, produced by a method according to claim 1, comprising a shell layer comprising a mix of a breather, a resin and fibre, and comprising an end fitting, wherein the shell layer and the end fitting form a unitary rigid structure able to withstand an overpressure of at least 2 bar.

* * * * *

UNITED STATES PATENT AND TRADEMARK OFFICE
CERTIFICATE OF CORRECTION

| | | |
|---|---|---|
| PATENT NO. | : 12,377,620 B2 | Page 1 of 1 |
| APPLICATION NO. | : 18/334032 | |
| DATED | : August 5, 2025 | |
| INVENTOR(S) | : Philippe Papin et al. | |

It is certified that error appears in the above-identified patent and that said Letters Patent is hereby corrected as shown below:

In the Claims

In Claim 1, at Lines 6-7, there should not be a line break between the words "large" and "enough".

Signed and Sealed this
Fourteenth Day of October, 2025

John A. Squires
*Director of the United States Patent and Trademark Office*